Oct. 14, 1941.   E. M. TORKELSON   2,258,826
INSTRUMENT FOR USE IN FLYING AIRCRAFT
Original Filed Nov. 18, 1936
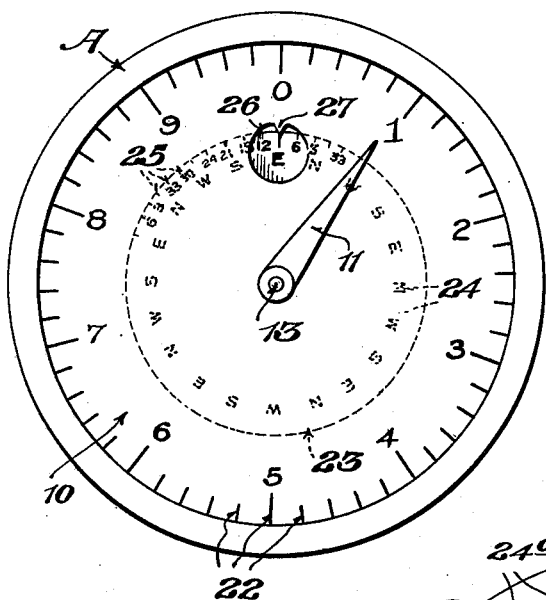
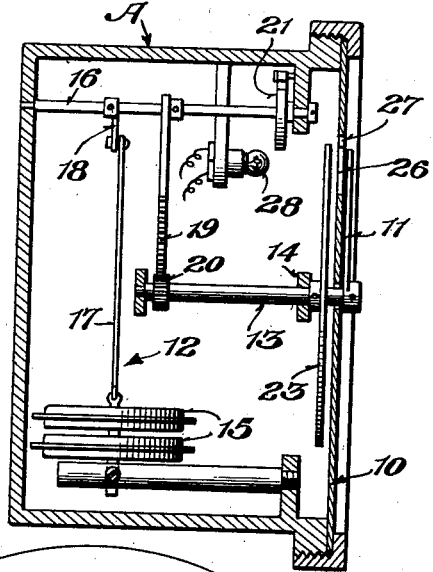
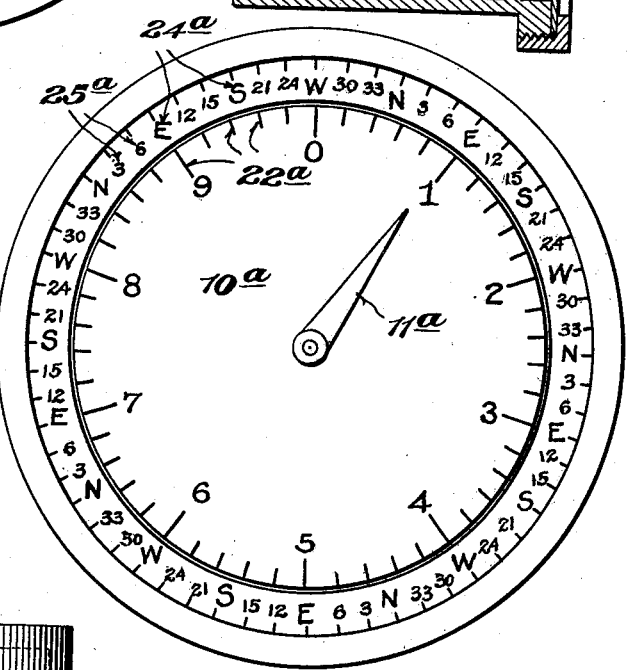
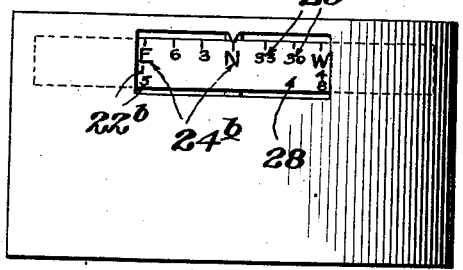
Inventor
E. M. Torkelson,
By D. P. Wolhaupter
Attorney Patented Oct. 14, 1941

2,258,826

UNITED STATES PATENT OFFICE 2,258,826

INSTRUMENT FOR USE IN FLYING AIRCRAFT

Eilet M. Torkelson, Elizabeth, N. J., assignor to Bendix Aviation Corporation, South Bend, Ind., a corporation of Delaware Application November 18, 1936, Serial No. 111,485
Renewed August 11, 1938

16 Claims. (Cl. 73—4)

This invention relates to improvements in instruments for use in the flying of aircraft, and has for one of its important objects to provide an instrument to be carried on an aircraft to indicate different compass courses to be flown by the aircraft at different altitudes, in accordance with regulations requiring that aircraft shall fly on headings within certain points of the compass at certain altitudes. In other words, present regulations require that flights on a heading from zero to 179 degrees, that is, east, generally, speaking, must be at odd thousand feet, that is, 1000, 3000, 5000 feet, and so on; that flights on a heading from 180 degrees to 359 degrees, that is, west, generally speaking, must be at even thousand feet, that is, 2000, 4000 feet, and so on; and that cross flights, with reference to airways, must be at intermediate altitudes of 500, 1500, 2500 feet, and so on; and, accordingly, the present instrument is designed to indicate the proper general heading or course to be flown by an aircraft when it is at any of such altitudes.

While the regulations mentioned require that flights must be on certain headings at certain altitudes, they make little or no provision for ascent or descent between such altitudes. The rule is proposed, therefore, that ascending aircraft shall turn to the right and descending aircraft shall turn to the left, proportionately varying their direction of flight 90 degrees for every 500 feet of change in altitude, thus following opposite spiral courses and thereby minimizing the possibility of collision. In accordance with this proposed rule another important object of the invention is to provide an instrument to indicate the proper direction of flight at every altitude, thus to assure proper spiral courses in ascending and descending.

Generally speaking, the present instrument comprises an element movable in response to changes in altitude of the instrument, and means associated with said element to indicate a certain direction for every position of the same, and in this connection other objects of the invention are to provide for embodiment of direction indicating means in accordance with the invention in altimeters of known types in thoroughly practical manners, at relatively small expense and without necessitating any material alterations of the altimetres.

It is obvious, of course, that the parts may be reversed and that a compass may be provided with designations of the desired elevations at which flight is to take place.

With the foregoing and other objects in view, which will become more fully apparent as the nature of the invention is better understood, the same consists in the novel features of combination and arrangement of elements as will be hereinafter more fully described, illustrated in the occompanying drawing and defined in the appended claims.

In the drawing, wherein like characters of reference denote corresponding parts in related views:

Figure 1 is a front elevation of an instrument constructed in accordance with one practical embodiment of the invention.

Figure 2 is a central, vertical section through the instrument shown in Fig. 1.

Figure 3 is a view similar to Fig. 1 illustrating an alternative embodiment of the invention; and Figure 4 is a front elevation illustrating another alternative embodiment of the invention.

Referring to the drawing in detail, first with particular reference to the embodiment of the invention illustrated in Figs. 1 and 2, A designates, generally, an altimeter of a known type including a dial 10 calibrated in thousands of feet, a pointer 11 cooperating with said dial, and means, designated generally as 12 for angularly moving said pointer over said dial in accordance with variations in altitude of the altimeter.

The pointer 11 is mounted on a shaft 13 suitably journaled in the frame structure 14 of the instrument and the means 12 for rotating said shaft and pointer comprises aneroid capsules 15 suitably supported on the frame of the instrument; a second shaft 16, suitably mounted on the frame of the instrument; a link 17 connecting the capsules 15 with a lever arm 18 on said shaft 16; a gear segment 19 on said shaft 16 meshing with a pinion 20 on the pointer shaft 13, and a spring 21 associated with the shaft 16 and tending constantly to rotate the same and the shaft 13 to move the pointer 11 to a position in which it indicates zero feet on the dial 10, which position said pointer occupies when the instrument is at sea level. The aneroid capsules expand with elevation of the instrument and contract with descent of the instrument, thereby, in conjunction with the spring 21, producing angular movements of the pointer 11 over the dial 10 in accordance with changes in the altitude of the instrument in a manner which is apparent and well known so that for any given altitude of the instrument the altitude in feet is indicated by the pointer 11 in conjunction with the calibrations 22 on the dial 10.

Now, in accordance with the present invention as shown in Figs. 1 and 2, the shaft 13 has mounted thereon, behind the dial 10, for rotation with said shaft and the pointer 11, a disk 23 carrying, at angularly spaced points, indications 24 of the major points of a compass and intermediate indications 25 of the points of a compass between the major points thereof. These indications 24 and 25, which may appropriately and respectively be the letters "W," "N," "E" and "S" arranged in that order in counterclockwise direction on the disk 23, and the degree indicating numbers 12, 15 between "E" and "S," 21, 24 between "S" and "W," 30 and 33 between "W" and "N," and 3, 6 between "N" and "E," are arranged circumferentially of the disk 23 in a number of successive series depending upon the maximum altitude which the altimeter is designed to measure and, in the angular relationship such that each series occupies an angle on the disk corresponding to the angle through which the disk 23 and the pointer 11 rotate during a change of 2,000 feet in altitude of the instrument. Moreover, said indications are arranged so as to become successively visible through a sight opening 26 in the dial 10 as the disk 23 rotates, and with one of the indications "W" disposed in alinement with said sight opening 26 when the instrument is at sea level with the pointer 11 alined with the zero feet indication on the dial 10. Thus, assuming that an aircraft equipped with the instrument is taking off from an airport, it is apparent that when an altitude of 500 feet is attained, as indicated by rotation of the pointer 11 relative to the dial 10 and by the cooperation of said pointer with the calibrations 22 on the dial 10, the disk 23 will have been rotated through an angle to bring the letter "N" into alinement with the sight opening 26 to indicate that at the altitude of 500 feet the heading of the aircraft should be north. Similarly, it is apparent that, upon the aircraft attaining another 500 feet of altitude or, in other words, an altitude of 1,000 feet, as indicated by the position of the pointer 11 relative to the dial 10, the disk 23 will have been rotated to a position in which the letter "E" alines with the sight opening 26, as shown in Fig. 1, thereby indicating that at the altitude of 1000 feet the heading of the aircraft should be east. Obviously, the same relationship between altitude and direction indication holds true for each further increase of 500 feet in altitude, so that when an altitude of 1500 feet is reached the direction indication is "S" and when an altitude of 2000 feet is reached the direction indication is "W." Obviously, too, for altitudes intermediate the basic altitudes in multiples of 500 feet, the degree indications 25 are brought into alinement with the sight opening 26 to indicate the proper direction of flight at any altitude between the basic altitudes of 500 feet and multiples thereof, so that any uncertainty regarding the proper direction of flight at any given altitude is entirely eliminated. Thus, manifestly, the instrument affords not only an accurate indication of the proper heading or direction of flight at any given basic flying altitude, but also a reliable means of guiding ascent and descent in spiral paths between basic flying altitudes.

Preferably there is provided a fixed index, such as a pointer 27, for cooperation with the indications 24, 25 on the disk 23. Preferably, too, the disk 23 is translucent and has arranged therebehind a suitable source of light 28, such as a small electric lamp, so that the indications 24, 25 are plainly visible through the sight opening 26.

Figure 3 of the drawing illustrates an alternative embodiment of the invention which differs from the embodiment of the invention illustrated in Figs. 1 and 2 primarily in that the direction indications, designated as 24ª, 25ª are fixed relative to the altimeter dial, designated as 10ª. That is to say, the indications 24ª, 25ª are provided directly on the dial 10ª and their relationship to the calibrations 22ª on the dial 10ª is the same as the relationship between the indications 24, 25 and the calibrations 22 on the dial 10 of the Figs. 1 and 2 embodiment of the invention. Thus, the pointer 11ª of the Fig. 3 embodiment of the invention indicates both altitude and the proper heading or direction of flight at any given altitude.

An altimeter, instead of having a fixed dial and a movable pointer may include a movable element in the form of a drum which rotates in accordance with changes in altitude of the instrument. An altimeter of this type is illustrated in Fig. 4 of the drawing, which figure additionally illustrates the adaptation to this type of altimeter, of direction indicating means in accordance with the invention. In other words, the drum, designated as 28, has applied to the periphery thereof direction indications 24ᵇ, 25ᵇ, bearing the same relationship to angular movements of said drum responsive to changes in the altitude thereof as the indications 24, 25 and 24ª, 25ª bear to the calibrations 22 and 22ª of the Figs. 1 and 3 embodiments of the invention, respectively. Thus, as the drum 28 rotates responsive to changes in altitude of the instrument, the proper direction of flight indication is brought into register with any suitable fixed index.

If the invention is embodied in an altimeter having a rotatable drum, the instrument preferably is mounted on the instrument board of the aircraft in vertical alinement with the usual compass so as to facilitate maintaining a correct compass course in accordance with the direction indications on the drum of the instrument.

In the case of embodiment of the invention in an altimeter of the drum type in which the drum makes more than one complete rotation within its limits of altitude measurement, a practical arrangement would be to have the drum make one-half a revolution for each 2000 feet of change in altitude and to have the indications 24ᵇ, 25ᵇ repeated on each of two opposite sides of the drum. This will give a range of 8000 feet with two complete revolutions of the drum, which, for all ordinary flying purposes is ample, and under such conditions altitude indications 22ᵇ may be arranged in two series on the drum as shown.

Without further description it is thought that the features and advantages of the invention will be apparent. It is desired to point out, however, that while certain specific embodiments of the invention have been illustrated and described, these, obviously, are merely representative and it is manifest that the invention may be embodied in various other specific forms within its spirit and scope as defined in the appended claims.

I claim:

1. In combination, an altimeter having an element movable responsive to changes in altitude of the altimeter, and fixed direction indicating means with which said element cooperates in any given position thereof to indicate a definite direction.

2. In combination, an altimeter including a fixed altitude scale, a pointer movable responsive to changes in altitude of the altimeter to indicate on said scale the altitude of the altimeter, an index, and a direction scale movable with said pointer and cooperating with said index to indicate a definite direction for any given position of said pointer.

3. In combination, an altimeter including a drum rotatable responsive to changes in altitude of the altimeter, an index, and a direction scale on said drum cooperating with said index to indicate a definite direction for any given rotated position of said drum.

4. In combination, an altimeter including a fixed altitude scale, a pointer movable responsive to changes in altitude of the altimeter to indicate on said scale the altitude of the altimeter, and a direction scale fixed with respect to said altitude scale so that for any given position of the pointer a definite altitude and a definite direction are indicated.

5. In an aircraft instrument for indicating a spiralling course of an aircraft, means responsive to changes in altitude of said craft, indicating means operable upon motivation of said responsive means, dial means graduated to indicate altitude upon operation of said responsive means, and means coacting with said altitude indicating means to designate the proper direction of flight to be flown by said craft at the indicated altitude.

6. In an aircraft instrument for indicating selectively correlated factors of altitude and direction to be flown by an aircraft, means responsive to one of these factors, indicating means actuated by said responsive means, dial means coordinating with said indicating means to designate the value of said one factor at one position of said responsive means, and means also operable by said responsive means to indicate a corresponding selectively correlated value of said other factor, whereby a pilot of an aircraft carrying the instrument knows that when he is flying at the indicated altitude he should fly in the indicated direction, so that all aircraft carrying an instrument of this type and flying in one direction will be at different altitudes from those flying in another direction.

7. In a combined altimeter and direction indicating device, expansible means responsive to changes in altitude, dial means calibrated in values of altitude, indicating means operable upon actuation of said expansible means for movement relative to said dial means, direction designating means operable upon actuation of said expansible means, said indicating means cooperating with said dial means to indicate a certain value of altitude at one position of said expansible means, and index means cooperating with said direction designating means for simultaneously indicating a desired direction.

8. In a device for indicating a spiralling course for aircraft, means responsive to changes of altitude, apertured dial means calibrated in values of altitude, indicating means operated by said responsive means and movable over said dial means, direction designating means operable by said responsive means and so located that said direction designations appear within said aperture.

9. In a device for indicating a spiralling course, altitude responsive means, dial means, indicating means rotatably mounted and movable with respect to said dial, an opening in said dial, transparent means carrying direction designations mounted for rotation with said indicating means behind said openings, means illuminating said transparent means, said indicating means and said transparent means being simultaneously operated by said altitude responsive means.

10. In an aircraft instrument for indicating the proper direction of flight to be flown by an aircraft at a designated altitude, means responsive to changes in altitude of said aircraft, indicating means operable upon motivation of said responsive means to indicate the altitude of said craft, and direction indicating means, said direction indicating means being so located with respect to said altitude indicating means at zero position thereof and cooperating therewith so that said direction indicating means designates the proper direction of flight to be flown by said aircraft at the indicated altitude, whereby the pilot of the aircraft knows that when he is flying at the indicated altitude he should fly in the indicated direction, so that all aircraft carrying an instrument of this type and flying in one direction will be at different altitudes from those flying in another direction.

11. In an aircraft indicating instrument, the combination of means responsive to changes in altitude, altitude indicating means actuated by said altitude responsive means, said altitude indicating means comprising pointer and scale means, and compass scale means cooperating with said altitude indicating means upon actuation of the latter for indicating predetermined directions of flight at predetermined altitude indications of said altitude indicating means, whereby the pilot of an aircraft carrying the instrument knows that when he is flying at the indicated altitude he should fly in the indicated direction, so that all aircraft carrying an instrument of this type and flying in one direction will be at different altitudes from those flying in another direction.

12. In an aircraft instrument for indicating selectively correlated factors of altitude and direction of flight to be flown by an aircraft, the combination of means responsive to one of said factors, indicating means actuated by said responsive means and including pointer and scale means to designate the value of said one factor, and other indicating means cooperating with said first indicating means upon actuation of the latter for indicating a selectively correlated value of the other factor, whereby the pilot of an aircraft carrying the instrument knows that when he is flying at the indicated altitude he should fly in the indicated direction, so that all aircraft carrying an instrument of this type and flying in one direction will be at different altitudes from those flying in another direction.

13. In a device of the character described, means responsive to changes in altitude, and direction indicating means connected to said altitude responsive means for actuation thereby.

14. In an aircraft instrument for indicating selectively correlated factors of altitude and direction of flight to be flown by an aircraft, means responsive to changes in one of said factors, and indicating means operable by said responsive means for indicating a selectively correlated value of said other factor.

15. In an aircraft instrument for indicating the direction in which an aircraft is to fly at different altitudes, means responsive to changes in altitude, and compass direction indicating means actuated by said altitude responsive means, said direction indicating means including a compass scale having graduations thereon selectively correlated to predetermined values of altitude, whereby a pilot observing the instrument will fly the craft at different altitudes for different directions of flight.

16. In an aircraft indicating instrument for indicating the direction in which an aircraft is to fly for any given altitude, or, conversely, for indicating the altitude at which the aircraft is to fly for any given direction of flight, a relatively stationary dial having a scale thereon and a window therein, a rotatable pointer cooperating with said scale, a rotatable dial beneath said relatively stationary dial and having a scale thereon visible through the window of said first dial, the scale of one of said dials being calibrated in terms of altitude and the scale of the other of said dials being calibrated in terms of compass direction selectively correlated to selected values on the altitude scale, and means responsive to changes in altitude for simultaneously actuating said rotatable pointer and said rotatable dial in accordance with changes in altitude, whereby a pilot observing the instrument will fly the aircraft at different altitudes for different directions of flight.

EILET M. TORKELSON.